US007423985B1

(12) United States Patent
Hill

(10) Patent No.: US 7,423,985 B1
(45) Date of Patent: Sep. 9, 2008

(54) SYSTEM FOR LARGE AREA TELEMETRY DATA COLLECTION NETWORKS

(76) Inventor: Jason Lester Hill, 35231 Camino Capistrano, Capistrano Beach, CA (US) 92624

( * ) Notice: Subject to any disclaimer, the term of this patent is extended or adjusted under 35 U.S.C. 154(b) by 171 days.

(21) Appl. No.: 11/143,149

(22) Filed: Jun. 2, 2005

Related U.S. Application Data

(60) Provisional application No. 60/576,793, filed on Jun. 3, 2004.

(51) Int. Cl.
*H04B 7/00* (2006.01)
(52) U.S. Cl. ............... 370/310.1; 370/310; 370/310.2; 370/338; 370/328; 455/414.1; 455/569.1
(58) Field of Classification Search ............... 370/310, 370/310.1, 310.2, 338, 328; 455/414.1, 569.1; 340/539.13; 375/132
See application file for complete search history.

(56) References Cited

U.S. PATENT DOCUMENTS

| | | | | |
|---|---|---|---|---|
| 6,751,455 | B1 * | 6/2004 | Acampora | 455/414.1 |
| 7,020,701 | B1 * | 3/2006 | Gelvin et al. | 709/224 |
| 7,089,089 | B2 * | 8/2006 | Cumming et al. | 700/295 |
| 7,091,852 | B2 * | 8/2006 | Mason et al. | 340/539.13 |
| 2002/0075940 | A1 * | 6/2002 | Haartsen | 375/132 |
| 2004/0125776 | A1 * | 7/2004 | Haugli et al. | 370/338 |
| 2005/0065743 | A1 * | 3/2005 | Cumming et al. | 702/62 |

OTHER PUBLICATIONS

Hill, Jason Lester, "System Architecture for Wireless Sensor Networks", PhD Thesis published at the University of California at Berkeley, 2003, pp. 1-186.
Hill, Jason et al., "System Architecture Directions for Networked Sensors", ASPLOS-IX, Cambridge, Massachusetts, Nov. 2000.
Chakeres, Ian D. et al., "AODV Routing Protocol Implementation Design", Proceedings of the International Workshop on Wireless Ad Hoc Networking (WWAN), Tokyo, Japan, Mar. 2004.
Culler, David et al., "Overview of Sensor Networks", IEEE Computer, Special Issue in Sensor Networks, Aug. 2004, pp. 41-49.

* cited by examiner

*Primary Examiner*—Sanh D. Phu
(74) *Attorney, Agent, or Firm*—Blakely, Sokoloff, Taylor & Zafman LLP

(57) ABSTRACT

System for large area such as citywide telemetry data collection networks using a Mesh network of nodes including a backbone network of nodes, usually powered, and a plurality of sensor nodes, usually battery operated, in the Mesh network to communicate directly or indirectly through other such nodes, to one or more backbone nodes. Power consumption is held very low for the battery powered nodes by only requiring communication over very short distances, and by synchronizing operation of the system with a low duty cycle. The system may be self configuring, such as by using the Ad hoc On Demand Distance Vector routing protocol. Two way communication is possible for control and other purposes. Various applications and possible features are disclosed.

16 Claims, 4 Drawing Sheets

SYSTEM FOR LARGE AREA TELEMETRY DATA COLLECTION NETWORKS

CROSS-REFERENCE TO RELATED APPLICATION

This application claims the benefit of U.S. Provisional Patent Application No. 60/576,793 filed Jun. 3, 2004.

BACKGROUND OF THE INVENTION

1. Field of the Invention

The present invention relates to the field of large area data communication and collection networks.

2. Prior Art

All cities have hundreds of remote locations that they would like to have real-time status information collected from. These could include sewer systems, power distribution systems, city buildings, private residences, utility meters, etc. Currently, there are no systems that are efficient at collecting data from hundreds of scattered locations distributed across a wide area.

Technologies do exist in the prior art for collecting telemetry data from the wide area. However these systems exploit single-hop long range transmitters. The sensors placed in the field are generally wired to large—suitcase sized—transmitter units that contain large batteries and directional antennas. These transmitter units send the sensor data directly back to the collection point. The cost and installation overhead of these transmitter units make it impractical to have a large number of sensors distributed throughout the environment. They are commonly used to monitor high-value assets such as oil wells.

DETAILED DESCRIPTION OF THE PREFERRED EMBODIMENTS

Figure 1:
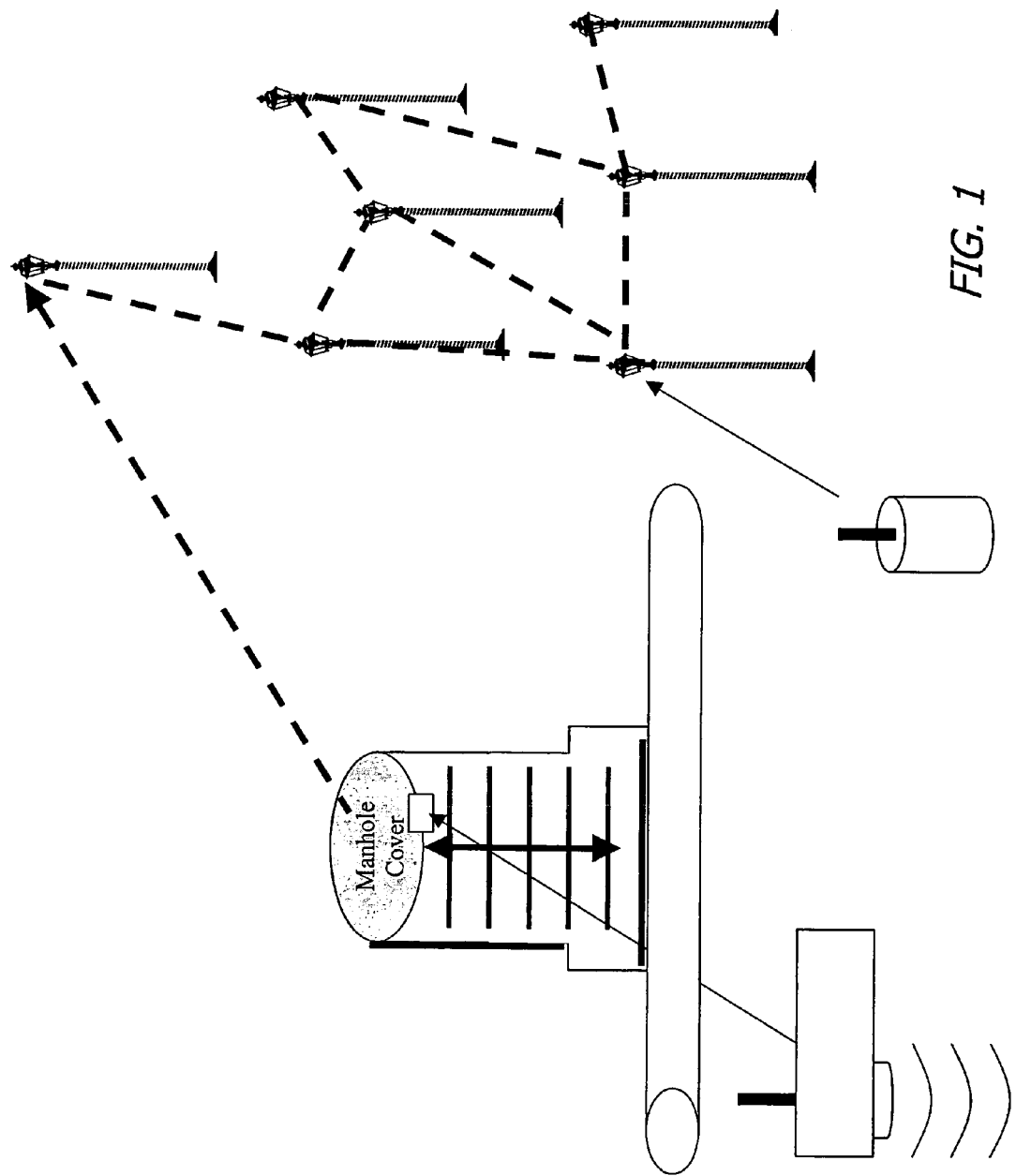
FIG. 1 is diagram schematically illustrating part of a typical network of the present invention with a battery powered sensor communicating with lamp top nodes of a backbone network.

The combination of low-cost and wide area networks presented in this invention is very unique. In general, there are low-cost Mesh network systems designed to cover a single building, and high-cost systems such as cellular telephone networks that are designed to cover an entire city. The preferred embodiments of the invention can cover the same area as cellular networks, but at a very small fraction of the cost for a given coverage area, and with 100 times the expected battery life at the end device. The preferred embodiments allow the entire sensor/transmitter unit to be only a few inches on a side and be very low cost. This is only possible with Mesh networking technology.

Thus the present invention is directed to methods and apparatus for collecting telemetry data from a distributed set of sensors in a city environment where public utilities are present. It achieves this by exploiting modern Mesh networking technology to form a low cost coverage area that spans an entire city. In contrast to cell phone networks, this Mesh network is designed to support battery operated devices that last for years without having to be connected to external power or recharged in any way. This is possible because of advanced algorithms for maintaining connectivity across the network. The network can have the capability to transmit data in both directions to and from each node.

A wireless Mesh network is a data communication network designed to exploit large numbers of relatively low cost devices to form a seamless web of connectivity. Each node in the network is both a user and provider of the network. The coverage area of the network is the union of the communication area of each individual node. When a new node is added, its communication area is added to the overall coverage area of the network.

Unlike traditional, cell phone based wireless networks, there is an extremely large amount of redundancy in a Mesh network. This allows the network to be extremely robust despite being constructed using low-cost devices. In a typical network, each node is located in the communication area of several other nodes. The nodes themselves must decide on an overall network routing topology that will facilitate efficient communication.

During communication in a Mesh network, nodes act as relays for each other's data. As long as a node is in the overall coverage area of the network and as long as the network does not have any partitions, any node can communicate with any other node via the Mesh network. A node that can only transmit a few feet via direct communication can tap into the Mesh network and communicate with nodes on the distant edge of the Mesh network. Additionally, nodes can bridge between the wireless Mesh and the traditional internet in order to forward data around the globe.

The concept of Mesh networking is quite simple. However the precise implementation is not. There are many important factors that must be balanced, including device cost, power consumption and range. Ultra low power consumptions is required to allow battery powered devices to last for multiple years. Currently, battery powered Mesh networking is limited to building scale networks. However, the present invention extends the application of battery powered Mesh networking to large area networks, such as citywide networks. More information on Mesh networking that can be applied for use in embodiments of the present invention can be found at:

"System Architecture Directions for Network Sensors", Jason Hill, Robert Szewczyk, Alec Woo, Seth Hollar, David Culler, Kristofer Pister, ASPLOS 2000, Cambridge, November 2000;

"Overview of Sensor Networks", David Culler, Deborah Estrin, Mani Srivastava, IEEE Computer, Special Issue in Sensor Networks, August 2004; and, "Mica: A Wireless Platform for Deeply Embedded Networks", Jason Hill and David Culler, IEEE Micro., vol 22(6), November/December 2002, pp 12-24, incorporated herein by reference.

The following is an illustrative description of such a system and how the system would work in the context of a city deployment. City management personnel would pre-deploy a set of Mesh infrastructure nodes throughout a city that will form the backbone of the data communication network. These two-way nodes would be small, unobtrusive and relatively inexpensive to deploy. Each node may, by way of example, communicate over approximately 0.75 miles in all directions. The city planners may select key locations throughout the city to achieve optimal coverage.

A unique deployment possibility will be to replace the photo sensors that are on top of streetlamps. A photo sensor could be replaced with a wireless Mesh node that is approximately the same size, as shown in FIG. 1. Externally the only difference would be that an antenna emerges from the top of the device. In addition to forming a Mesh networking routing point, the device would replace or duplicate the functionality of the street light photo sensor and control the operation of the streetlamp. The existing standard connector would be used to power and physically mount the wireless repeater node. The compact physical size of the router would make this possible.

In this deployment, each router node can optionally be supplied with power and requires no other connections. The telemetry data transmitted across the network is wirelessly relayed between routing nodes back to the central collection point or multiple collection points, or Base Stations, one such Base Station being shown in the diagram of FIG. 2. From there it can be placed into databases or sent to the proper authority. For example fire sensors placed in peoples homes or public buildings that connect to this Mesh network would have their data sent directly to the local fire department.

Figure 3:
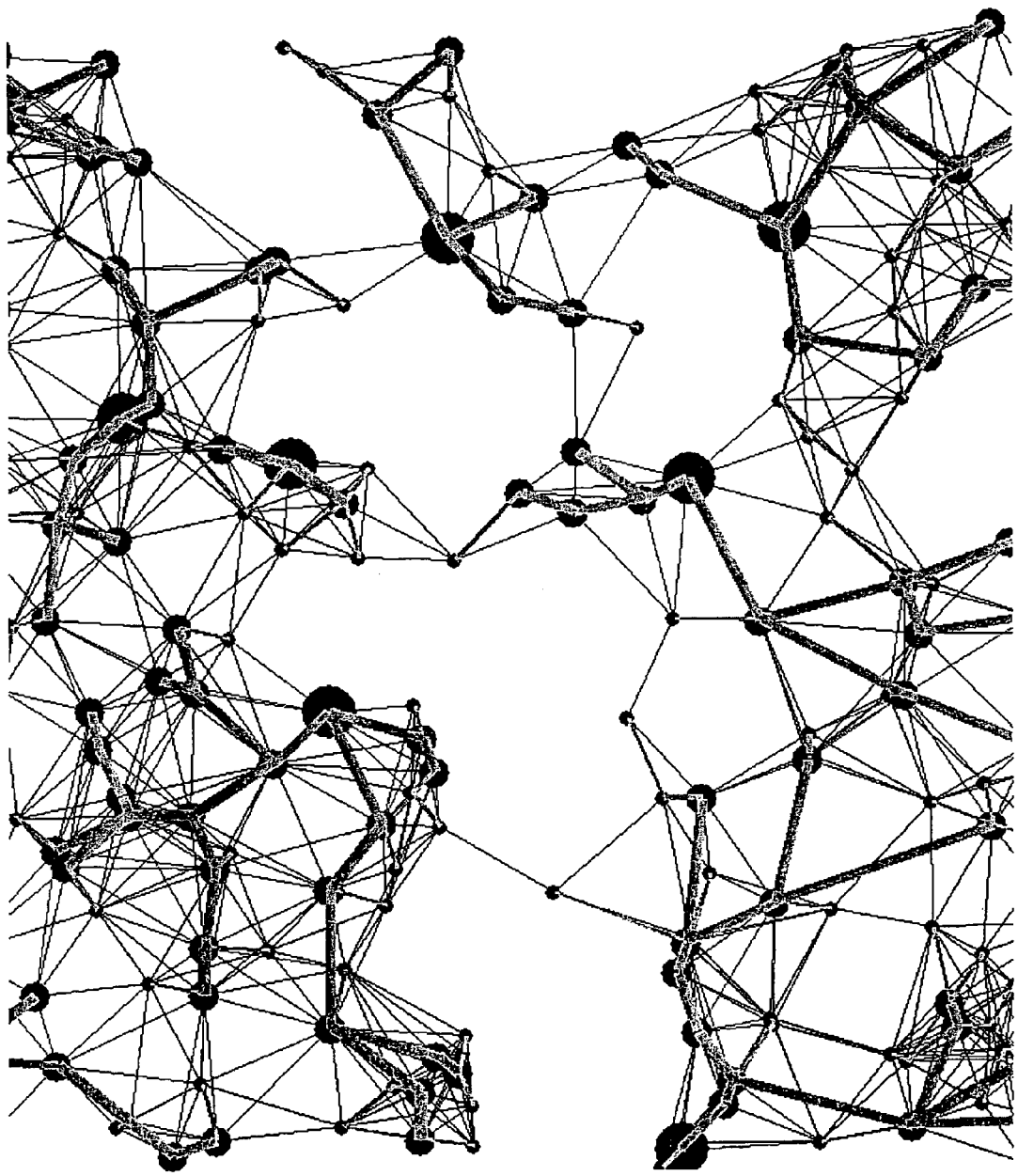
FIG. 3 is still another diagram illustrating part of a typical network of the present invention with a plurality of battery powered sensors communicating with lamp top nodes of a backbone network in turn communicating with a plurality of Base Stations.

FIG. 3 is an exemplary overview of a large area Mesh network such as a Citywide Mesh network in accordance with the invention. The small circles represent battery powered nodes that typically would include one or more sensors and have the capability of transmitting its own information as well as relaying information from an adjacent node to other adjacent nodes. The intermediate sized circles represent powered nodes of the backbone, such as pole top nodes, that could include one or more sensors, but as a minimum, can receive and relay information from and to battery powered nodes. "Powered nodes" as used herein is used to mean nodes powered by a source of power more robust than dry cells, and includes but is not necessarily limited to nodes powered by the municipal power grid, such as 110 volt or 220 volt AC power. Since these are powered and typically much fewer in number, they may be more sophisticated, communicating with one or more Base Stations directly or over the backbone of such nodes, depending on their location with respect to the Base Stations. These communication links typically can have preferred communication links to Base Stations with alternate links being available through other such nodes if the primary link is down for some reason, such as indicated by no acknowledgement of receipt of a transmission. The Base Stations may, but not necessarily, determine at least the primary links, and can reconfigure the backbone as appropriate as additional such nodes are added or removed or otherwise disabled. On failure of a particular powered node, the backbone would reconfigure itself as required to complete the necessary communication with the Base Stations.

Each sensor device connected to the system would be a small low-cost battery powered device that would periodically send telemetry data directly or indirectly to the powered nodes over the network. For example, sensors could be placed underneath sewer manholes that ultrasonically detect the level of the sewage as also illustrated in FIG. 1. Once transmitted back to a central collection point, this data could be used to detect sewer blockage, sewer pipe leaks or illegal sewer entry. Alternatively, sensors could be connected to utility meters to perform automatic meter reading, to security systems to perform wireless alarm reporting, to fire sensors to automatically dispatch firefighters, to panic buttons to automatically dispatch police, to city irrigation systems to automatically detect leaks, to erosion control systems to automatically detect excessive soil moisture, to chemical sensors to automatically detect toxic gases, etc. The system could also be used for such things as city utility maintenance, environmental monitoring and even people tracking.

The key feature of this systems is that these sensors can be very small, low cost and will operate for years off of standard batteries. Alternatively, where electrical power is available, sensors could be powered other than by battery, though typically at most, that would normally only apply to a fraction of the total sensors in the Mesh network. In some instances, solar power with or without nighttime backup could be used.

Figure 2:
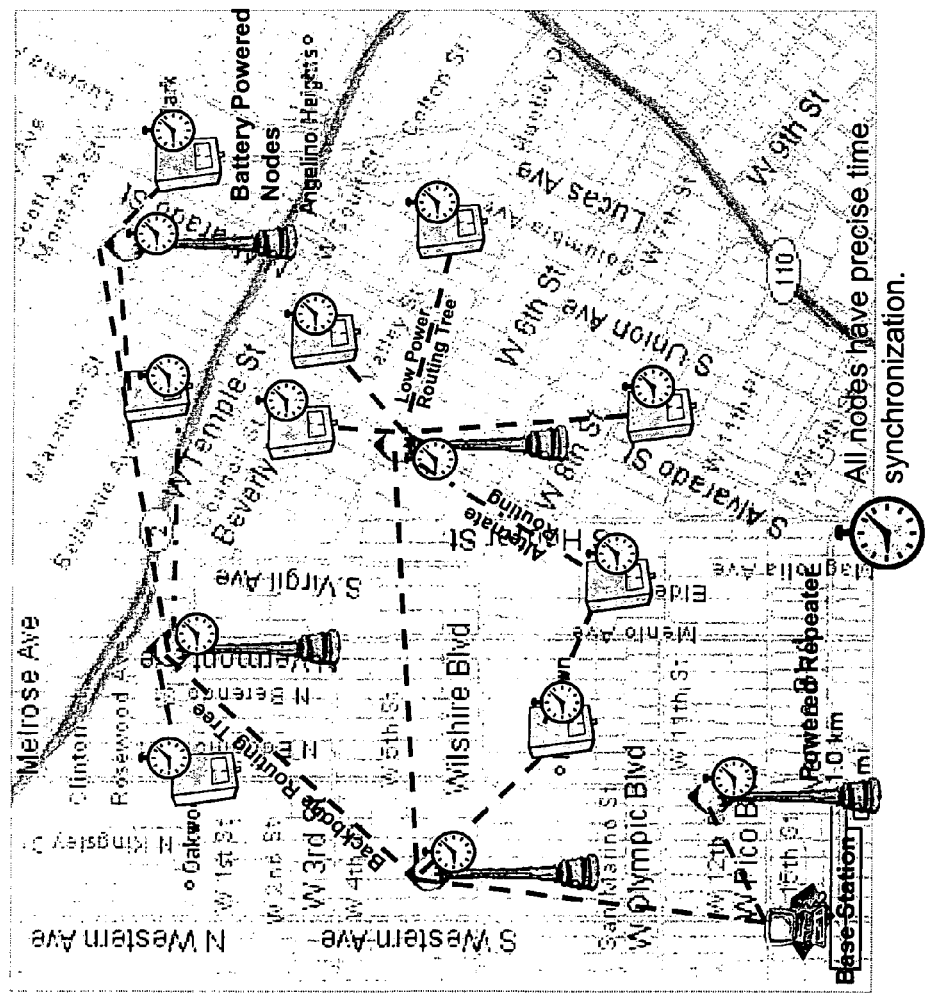
FIG. 2 is another diagram illustrating part of a typical network of the present invention with a plurality of battery powered sensors communicating with lamp top nodes of a backbone network in turn communicating with at least one Base Station, and with synchronized communication time slots.

The battery powered nodes are synchronized, as indicated by the clock symbols in FIG. 2, and transmit and receive to and from other battery powered nodes and backbone nodes in narrow time windows separated by longer periods of inactivity so that their duty cycle is very low. In that regard, a battery powered node need only transmit on low power, and then typically transmit very little information with a very low duty cycle. For instance, a battery powered node need only identify itself within the group of battery powered nodes that are within communication distance of a powered node, as the powered node may add an address component that will uniquely identify the battery powered node relative to all other battery powered nodes in the Mesh network. In some cases, such as for a battery powered sewage depth sensor node, the sensor itself would be pulsed occasionally, and the information transmitted may be only a few bits identifying the node to a powered node and a few bits indicative of sewage depth. In other cases such as a fire sensor, the ultimate information transmitted may simply be a yes or no type of signal. In general, the battery powered nodes need to periodically transmit their status, such as I'm OK and there is nothing to report, so that failure to so report will call for service, though this may be on a less frequent basis than the periodic communication window for reporting of an alarm or other condition needing attention.

All of the sensors that are placed inside the wide area will join the Mesh network already outlined by the pre-deployed router nodes. They will periodically transmit their data to the nearest router node, which will then forward the data across the network. For increased capacity, data extraction points can be placed in the network to collect the data from a given region of the area and transmit it back to the central collection point directly. These nodes could use cellular, DSL, or other communication technologies to transmit the data from several hundred sensors back to the central location. At the city control center, data can be distributed to the interested parties.

By way of example only, the battery powered nodes might be able to communicate over approximately 3000 feet in all directions. This would require a transmission power of approximately 1000 milliwatts (30 dbm) and a receiver sensitivity of −110 dbm. With modern communication electronics this transmission will consume just 1500 milliwatts to generate and the receiver would consume 90 milliwatts to operate. In some instances, a battery powered node may rely on one or more other battery powered nodes to reach a powered node, though normally the number of battery powered nodes so relied on would be small. With the exemplary transmit and receive power, an efficient network protocol would have nodes transmitting for just 10 milliseconds every 300 seconds and listening for incoming messages for 2 milliseconds every second. Such a node would dissipate 7253 joules per year. In that regard, standard D size Alkaline batteries can provide 72,000 joules each. Thus batteries in a battery powered node may be expected to operate for years, approaching the shelf life of the batteries.

In addition to including sensors, this system may include actuators. The Mesh technology provides 2-way communication to all devices. City or private control systems could be built using the Mesh networking. City irrigation could be controlled wirelessly from a central internet terminal or a homeowner could control his alarm system. This two-way communication could also be used to allow sensor data to be sent on demand. A central control system could issued commands to valves, motors, signals or alarms via the mesh network. Control messages to actuators can be based on input coming from the sensors connected to the network. For example, air conditioners could be shutoff automatically if the total power consumption of a city exceeds a threshold.

This telemetry data collection network could also be used as a two way communications network. Vehicles such as fire and police cars could send and receive messages with their counterparts and headquarters. Individuals could carry compact devices which could send and receive text messages or even voice messages. These compact devices could be used as panic buttons to summon medical, police or fire department help. The network can provide location information on nodes within the network to allow tracking of mobile nodes as they move throughout the city.

Thus recent advances in low-power radios and microcontrollers allows small battery powered wireless communication devices to be constructed that can be placed throughout a city. For example a CC1000 Radio manufactured by Chipcon can be combined with a TI MSP430 microcontroller manufactured by Texas Instruments can be the brains of the devices. The microcontroller can simultaneously interact with the sensor and control the radio. In the case of the repeater nodes, the microcontroller will only have to manage the radio.

The multi-hop Mesh network formed by the router nodes can be constructed using the AODV (Ad hoc On Demand Distance Vector) routing protocol. (There is much published information on AODV, see for instance, Ian D. Chakeres and Elizabeth M. Belding-Royer. *"AODV Routing Protocol Implementation Design." Proceedings of the International Workshop on Wireless Ad Hoc Networking (WWAN)*, Tokyo, Japan, March 2004). The Ad hoc On Demand Distance Vector (AODV) routing algorithm is a well known routing protocol designed initially for ad hoc mobile networks. AODV is capable of both unicast and multicast routing. It is an on demand algorithm, meaning that it builds routes between nodes only as desired by source nodes. It maintains these routes as long as they are needed by the sources. Additionally, AODV forms trees which connect multicast group members. The trees are composed of the group members and the nodes needed to connect the members. AODV uses sequence numbers to ensure the freshness of routes. It is loop-free, self-starting, and scales to large numbers of nodes. Thus this protocol explores the network topology and creates a routing structure that will funnel the data back to the collection point. Additionally, AODV can be tuned to give routing priority to backbone, powered or routing nodes. Routes will be selected that automatically exploit the extra capability of certain nodes while still allowing for the possibility of using battery powered nodes for routing purposes to maintain network connectivity. Thus both the backbone and battery powered nodes can be covered by a single AODV routing structure. For the downstream communication direction, local area flooding can be used to make sure that all devices in a given area receive command messages. The nodes themselves will determine if the message is for them. Small sections of the large Mesh network may be enabled to autonomously reconfigure, rerouting using local information without affecting other parts of the network (distribution routing algorithm without the use of centralized control). Preferably such small sections would be within communication range of a plurality of backbone nodes so as to not be dependent on satisfactory operation of any one such node.

The ability to have small sections of the network reconfigure autonomously allows nodes to enter and leave the network easily. Only the handful of nodes surrounding an arrived/departed node must be aware of the change. Additionally if a network route or node fails the surrounding nodes can autonomously reconfigure to route the data around such a failure and establish a new routing structure. Through link failures and the creation of new links due to new nodes joining, the AODV routing structure is continually updating and improving itself.

A lamp-pole routing module can be connected into the power supply of the light post using the standard IEEE C136 interface designed for photo sensors. By constructing it with the same general form factor as the existing photo sensor devices, it can easily replace them. This will minimize installation time and cost. To prevent a network overload, each routing node will limit the amount of data it will forward from a given sensor node. If a sensor node begins to transmit too much data, the closest routing node will automatically drop its data.

In order to comply with FCC regulations, the network may operate in the 902-928 MHz ISM band (unlicensed) and use frequency hopping or direct sequencing spread spectrum techniques to reduce interference.

Figure 4:
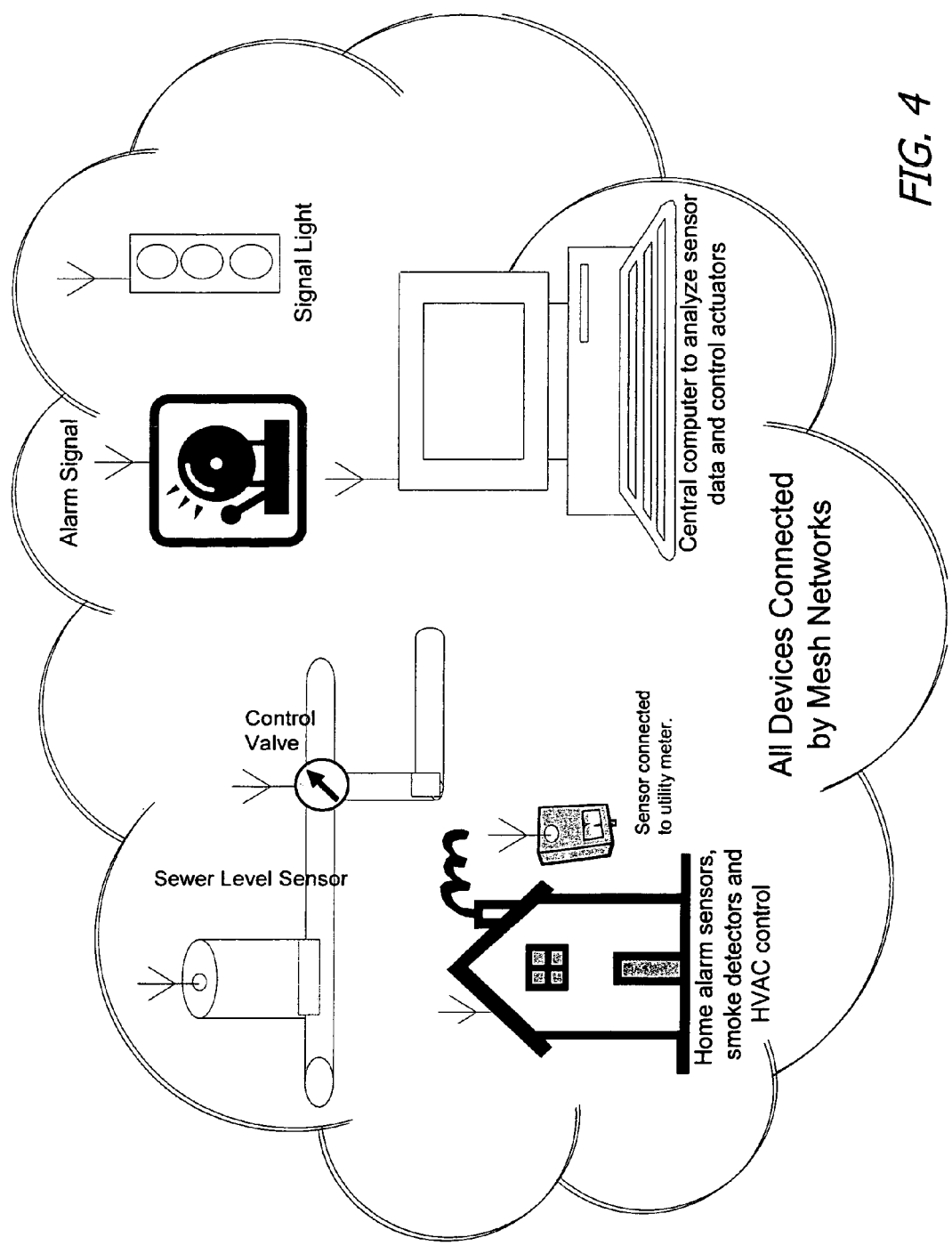
FIG. 4 illustrates some of the various sensors and controls that may be coupled to the wide area network of the present invention.

The Large Area Network could be utilized to monitor and control utility systems across a large area. Usage and flows could be reported and actions ordered based on analysis of the telemetry data. For example, a sewer system could monitor the levels and flows in the sewers as reported over the network and then send commands to position valves, run pumps, or even dispatch workers to fix problems. As another example, an electric utility could monitor usage, report peak usage, read meters, and send commands to shed loads at peak times such as cycling air conditioners on and off for specified duty cycles. Water systems could detect anomalies in flow patterns and sound alarms, command valves, power up pumps, or command other actions. Signal lights might be monitored for proper operation, or even controlled in the case of special occasions or special circumstances. Various of these applications and sensors and controls, some depending on unidirectional and some depending on bi-directional communication are illustrated in FIG. 4.

Very efficient battery powered nodes could be attached to vehicles or people to track and report their movements throughout the wide area. Messages could be sent to and from these nodes.

Network nodes that utilize the wide area network can be used to monitor burglar alarms and report entries and alarm conditions to the appropriate authorities or monitoring companies. In this way fire departments could be immediately informed of fires at the same time monitoring companies and owners were informed over the wide area network. Likewise a vehicle alarm could communicate the vehicle's theft to the police and the owner carrying a battery powered node and then track the vehicle's movements throughout the wide area network territory and report it in real time.

In general, there will be at least one bridge node that connects the wide area or citywide Mesh network to a more traditional computing device. This bridge node can process the data coming from the network and place the data into a database such as SQL Server from Microsoft. From there, the data can be presented to users via a web interface. Charts and graphs of the data can be generated in real-time to allow users to detect any potential problems. Additionally, e-mails and text messages can be sent if personnel must be notified immediately. Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A data collection network comprising:
   a plurality of communication nodes forming a Mesh network, at least a plurality of the communication nodes each being battery powered and each coupled to a sensor for communicating the output of the sensor over the network, the Mesh network being coupled in communication with a base station, nodes forming the Mesh network being synchronized for synchronized communication separated by longer periods of inactivity for conservation of battery power, and
   a wireless backbone of a plurality of powered nodes wherein the powered nodes comprise a plurality of communication nodes disposed in streetlight photo sensor sockets and also duplicating the function of the streetlight photo sensor.

2. The network of claim 1 wherein communication over the network uses spread spectrum communication.

3. The network on claim 2 wherein communication is over an unlicensed frequency band.

4. The network of claim 3 wherein communication is in the 902-928 MHz ISM band.

5. The network of claim 2 wherein communication over the network uses frequency hopping.

6. The network of claim 1 wherein the network is auto-reconfiguring upon the addition of a node, the movement of a node, the failure of a node or the removal of a node using a distributed routing algorithm.

7. The network on claim 6 wherein small sections of the Mesh network are configured to autonomously reconfigure message routing within that section using local information without affecting other parts of the network and without the use of centralized control.

8. The network of claim 6 wherein the Mesh network uses a decentralized routing protocol such as the Ad hoc On Demand Distance Vector routing protocol.

9. The network of claim 1 wherein at least some of the communication nodes are bi-directional communication nodes for receiving and forwarding messages from a base station to other communication nodes, at least some of the communication nodes being configured to respond to messages received for causing some action responsive to a received message addressed to that communication mode.

10. The network of claim 1 wherein at least some of the communication nodes are configured to monitor municipal utilities.

11. A data collection network comprising:
    a plurality of communication nodes forming a Mesh network, at least a plurality of the communication nodes each being battery powered and coupled to a sensor for communicating the output of the sensor over the network, the network further comprised of a backbone of powered nodes in communication with a base station, communication nodes forming the Mesh network being synchronized for synchronized communication to backbone nodes separated by longer periods of inactivity for conservation of battery power,
    wherein the backbone nodes comprise a plurality of communication nodes disposed in streetlight photo sensor sockets and also duplicating the function of the streetlight photo sensor.

12. The network of claim 1 wherein the powered nodes and at least some of the communication nodes are bi-directional communication nodes for receiving and forwarding messages from a base station to other nodes, at least some of the communication nodes being configured to respond to messages received for causing some action responsive to a received message addressed to that communication mode.

13. The network of claim 11 wherein at least some of the communication nodes are configured to monitor municipal utilities.

14. A data collection network comprising:
    a plurality of communication nodes forming a Mesh network, at least a plurality of the communication nodes each being battery powered and coupled to a sensor for communicating the output of the sensor over the network using the Ad hoc On Demand Distance Vector routing protocol, the network further being comprised of a backbone of powered nodes in communication with a base station, communication nodes forming the Mesh network being synchronized for synchronized communication to backbone nodes separated by longer periods of inactivity for conservation of battery power,
    wherein the backbone nodes comprise a plurality of communication nodes disposed in streetlight photo sensor sockets and also duplicating the function of the streetlight photo sensor.

15. The network of claim 14 wherein the powered nodes and at least some of the communication nodes are bi-directional communication nodes for receiving and forwarding messages from a base station to other nodes, at least some of the communication nodes being configured to respond to messages received for causing some action responsive to a received message addressed to that communication mode.

16. The network of claim 14 wherein at least some of the communication nodes are configured to monitor municipal utilities.

* * * * *